United States Patent
Guo et al.

(10) Patent No.: US 11,454,278 B2
(45) Date of Patent: Sep. 27, 2022

(54) POWER SUPPLY SYSTEM FOR MAGNETIC BEARING AND CONTROL METHOD THEREFOR

(71) Applicant: Gree Green Refrigeration Technology Center Co., Ltd. of Zhuhai, Zhuhai (CN)

(72) Inventors: Weilin Guo, Zhuhai (CN); Yongling He, Zhuhai (CN); Fan Wang, Zhuhai (CN); Daofu Hu, Zhuhai (CN)

(73) Assignee: Gree Green Refrigeration Technology Center Co., Ltd. of Zhuhai, Guangdong (CN)

( * ) Notice: Subject to any disclaimer, the term of this patent is extended or adjusted under 35 U.S.C. 154(b) by 474 days.

(21) Appl. No.: 16/633,958

(22) PCT Filed: Oct. 29, 2018

(86) PCT No.: PCT/CN2018/112306
§ 371 (c)(1),
(2) Date: Jan. 24, 2020

(87) PCT Pub. No.: WO2019/091297
PCT Pub. Date: May 16, 2019

(65) Prior Publication Data
US 2020/0208679 A1  Jul. 2, 2020

(30) Foreign Application Priority Data
Nov. 7, 2017  (CN) .......................... 201711085437.X (51) Int. Cl.
*F16C 32/04* (2006.01)
*H02K 7/09* (2006.01)
(Continued)

(52) U.S. Cl.
CPC ...... *F16C 32/0442* (2013.01); *F16C 32/0451* (2013.01); *F16C 32/0457* (2013.01);
(Continued)

(58) Field of Classification Search
CPC .......... H02K 7/09; H02M 5/458; H02M 3/04; H02M 1/00; H02M 1/36; H02M 1/007;
(Continued)

(56) References Cited

U.S. PATENT DOCUMENTS

| 5,574,345 | A | * | 11/1996 | Yoneta | ................... | F04D 19/048 |
| | | | | | | 310/90.5 |
| 5,917,297 | A | * | 6/1999 | Gerster | ................... | H02J 9/066 |
| | | | | | | 318/459 |
| 9,865,426 | B2 | * | 1/2018 | Tran | ........................ | H02M 1/36 |

FOREIGN PATENT DOCUMENTS

| CN | 1599239 A | 3/2005 |
| CN | 1776550 A | 5/2006 |

(Continued)

*Primary Examiner* — Emily P Pham
(74) *Attorney, Agent, or Firm* — The Webb Law Firm (57) ABSTRACT

The present disclosure provides a power supply system for a magnetic bearing and a control method therefor. The system includes a rectifying and filtering circuit configured to rectify and filter an alternating current to obtain a first direct current with a first DC bus voltage, the first direct current being configured to supply power to an electric motor controller of an electric motor to which the magnetic bearing belongs; a power obtaining circuit configured to obtain a second direct current with a second DC bus voltage from the first direct current, the second DC bus voltage being within an input voltage range allowed by the DC-DC power supply; a DC-DC power supply configured to convert the second direct current to a third direct current with a third DC bus voltage, the third direct current being configured to supply power to a bearing controller of the magnetic bearing.

20 Claims, 2 Drawing Sheets

(51) Int. Cl.
*H02M 1/36* (2007.01)
*H02M 5/458* (2006.01)
*H02N 15/00* (2006.01)
*H02M 1/00* (2006.01)
*H02M 3/04* (2006.01)

(52) U.S. Cl.
CPC ................ *H02K 7/09* (2013.01); *H02M 1/00* (2013.01); *H02M 1/36* (2013.01); *H02M 3/04* (2013.01); *H02M 5/458* (2013.01); *H02N 15/00* (2013.01); *H02M 1/007* (2021.05); *H02M 1/009* (2021.05)

(58) Field of Classification Search
CPC .... H02M 1/009; H02N 15/00; F16C 32/0442; F16C 32/0451; F16C 32/0457
See application file for complete search history.

(56) References Cited

FOREIGN PATENT DOCUMENTS

| | | |
|---|---|---|
| CN | 101510098 A | 8/2009 |
| CN | 202679265 U | 1/2013 |
| CN | 202721450 U | 2/2013 |
| CN | 103701336 A | 4/2014 |
| CN | 203691301 U | 7/2014 |
| CN | 105151927 A | 12/2015 |
| CN | 106849789 A | 6/2017 |
| CN | 108167330 A | 6/2018 |
| DE | 19506849 A1 | 8/1995 |
| EP | 0430009 A1 | 6/1991 |
| JP | 62297533 A | 12/1987 |
| JP | 404127895 U | 11/1992 |
| JP | 407238929 A | 9/1995 |
| JP | 9112482 A | 5/1997 |
| WO | 0221674 A1 | 3/2002 |

\* cited by examiner

POWER SUPPLY SYSTEM FOR MAGNETIC BEARING AND CONTROL METHOD THEREFOR

CROSS-REFERENCE TO RELATED APPLICATIONS

This application is the United States national phase of International Application No. PCT/CN2018/112306 filed Oct. 29, 2018, and claims priority to Chinese Patent Application No. 201711085437.X filed Nov. 7, 2017, the disclosures of which are hereby incorporated by reference in their entirety.

TECHNICAL FIELD

The present invention relates a power supply system for a magnetic bearing and a control method therefor.

BACKGROUND

A magnetic bearing makes a rotor (i.e., shaft) of an electric motor suspend in the air by magnetic force effect and is not in mechanical contact with a stator of the electric motor.

In an electric motor power control system for a magnetic bearing, the low voltage power supply of a bearing controller is provided by a DC-DC power supply, while the power supply of an inverter module in the bearing controller is directly provided by a DC bus voltage of a main power supply. The DC bus voltage also supplies power to the electric motor at the same time.

SUMMARY

The present invention provides a power supply system for a magnetic bearing. The power supply system comprises: a rectifying and filtering circuit, a power obtaining circuit, and a DC-DC power supply, wherein: the rectifying and filtering circuit is configured to rectify and filter an alternating current from an AC input power supply to obtain a first direct current with a first DC bus voltage, wherein the first direct current is configured to supply power to an electric motor controller of an electric motor to which the magnetic bearing belongs; the power obtaining circuit is configured to obtain a second direct current with a second DC bus voltage from the first direct current, wherein the second DC bus voltage is within an input voltage range allowed by the DC-DC power supply; and the DC-DC power supply is configured to convert the second direct current to a third direct current with a third DC bus voltage, wherein the third direct current is configured to supply power to a bearing controller of the magnetic bearing.

Matched with the above power supply system, in another aspect of the present invention, a control method of the power supply system for a magnetic bearing is provided. The control method comprises: rectifying and filtering, by a rectifying and filtering circuit, an alternating current from an AC input power supply to obtain a first direct current with a first DC bus voltage, wherein the first direct current is configured to supply power to an electric motor controller of an electric motor to which the magnetic bearing belongs; obtaining, by a power obtaining circuit, a second direct current with a second DC bus voltage from the first direct current, wherein the second DC bus voltage is within an input voltage range allowed by the DC-DC power supply; converting, by the DC-DC power supply, the second direct current to a third direct current with a third DC bus voltage, wherein the third direct current is configured to supply power to a bearing controller of the magnetic bearing.

Other features and advantages of the present invention will be explained in the following specification, and will partly become apparent from the specification, or be understood by implementing the present invention.

The technical solutions of the present invention will be further described in detail with reference to drawings and embodiments.

In conjunction with the accompanying drawings, the reference signs in the embodiments of the present disclosure are as follows:

1-rectifying and filtering circuit; 2-DC-DC power supply; 3-magnetic bearing; 4-bearing controller; 5-electric motor controller; 6-electric motor; 7-voltage detection circuit; 8-switch control circuit; 9-power obtaining circuit.

DETAILED DESCRIPTION

In order that the purposes, technical solutions and advantages of the present disclosure clearer, a clear and complete description of technical solutions of the present disclosure will be given below in combination with specific embodiments of the present disclosure and corresponding drawings. Apparently, the embodiments described below are merely a part, but not all, of the embodiments of the present disclosure. All other embodiments, obtained by those skilled in the art based on the embodiments of the present disclosure without any creative effort, fall into the protection scope of the present disclosure.

In an electric motor power control system for a magnetic bearing, the low voltage power of the bearing controller is provided by a DC-DC power supply, while the power supply of an inverter module in the bearing controller is directly provided by a DC bus voltage of the main power supply. During running of the electric motor, the DC bus voltage may fluctuate due to a change in the load of the electric motor, which may directly affect the control effect of the magnetic bearing. When the voltage of in input power supply is high, for example the input power supply is a three-phase AC power input, the DC bus voltage is high. At this time, since the inverter module of the bearing controller is directly powered by the DC bus voltage, it is difficult to select the power device in the bearing controller and the cost and the control difficulty of the power device is high.

In a power supply system for a bearing, high voltage DC-DC power supply may not work in a case where the input power supply is normal, and may work in a case where the input power supply is abnormal. There are also factors such as a high bus voltage and a bus voltage fluctuation that affect the control of the magnetic bearing.

Another power supply system for a bearing comprises an AC-DC power supply and a DC-DC power supply. The structure of this power supply system is complicated due to require two power supplies, which reduces the reliability of the power supply system and involves a high cost.

Figure 1:
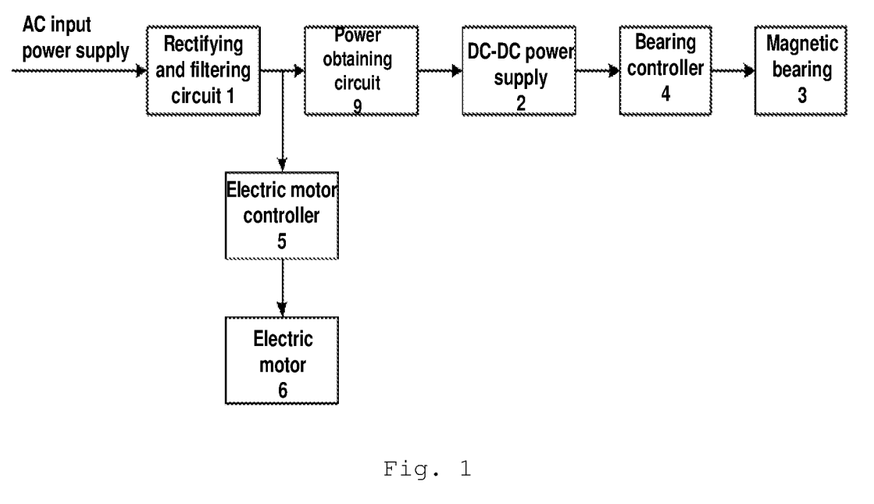
FIG. 1 is a schematic structural view showing a power supply system for a magnetic bearing according to some embodiments of the present disclosure.

According to embodiments of the present disclosure, a power supply system for a magnetic bearing is provided, as shown in FIG. 1, which is a schematic structural view showing a power supply system for a magnetic bearing according to some embodiments of the present disclosure. The power supply system for a magnetic bearing may comprise a rectifying and filtering circuit 1, a power obtaining circuit 9, and a DC-DC power supply 2.

In some embodiments, the rectifying and filtering circuit 1 is configured to rectify and filter an alternating current from an AC input power supply to obtain a first direct current with a first DC bus voltage. The first direct current is configured to supply power to the electric motor controller 5 of the electric motor 6 to which the magnetic bearing belongs. It should be understood that the magnetic bearing configured to make the rotor of the electric motor 6 suspend.

For example, the rectifying and filtering circuit 1 comprises a rectifying circuit and a filtering circuit. The rectifier circuit is configured to rectify the alternating current from the AC input power supply to obtain a first direct current with a first DC bus voltage. The first direct current is configured to supply power to the electric motor controller 5 of the electric motor 6 to which the magnetic bearing belongs. The filter circuit is configured to filter the first direct current and supply the filtered first direct current to at least one of the electric motor controller 5 or the power obtaining circuit 9.

For example, the alternating current from the AC input power becomes to be with a higher DC bus voltage (e.g., a DC bus voltage Ub) after being rectified and filtered by the rectifying and filtering circuit 1. The DC bus voltage Ub is supplied to the electric motor controller 5 for controlling the electric motor 6.

In one some embodiments, the power obtaining circuit 9 is configured to obtain a second direct current with a second DC bus voltage from the first direct current. The second DC bus voltage is within an input voltage range allowed by the DC-DC power supply 2.

For example, the first direct current first passes through a parallel circuit (e.g., the power obtaining circuit 9) comprising a voltage dividing resistor R and a switch K before being supplied to the DC-DC power supply 2.

In some embodiments, the DC-DC power supply 2 is configured to convert the second direct current to a third direct current with a third DC bus voltage. The third direct current is configured to supply power to the bearing controller 4 of the magnetic bearing 3. The third DC bus voltage is within a power supply voltage range allowed by the bearing controller 4.

For example, the DC-DC power supply directly obtains power from the first direct current with the first DC bus voltage, and the bearing controller is entirely powered by the DC-DC power supply.

For example, the DC-DC power supply 2 converts the direct current supplied by the power obtaining circuit 9 into a direct current with a stable and lower voltage before supplying to the bearing controller 4 for controlling the magnetic bearing 3.

For example, the bearing controller 4 is entirely powered by the DC-DC power supply 2.

Therefore, the magnetic bearing controller is entirely powered by the DC-DC power supply, thereby improving the stability of running of the magnetic bearing. The problem that the DC bus voltage fluctuation affects the control stability of the magnetic bearing is solved and the power supply reliability is enhanced.

Figure 2:
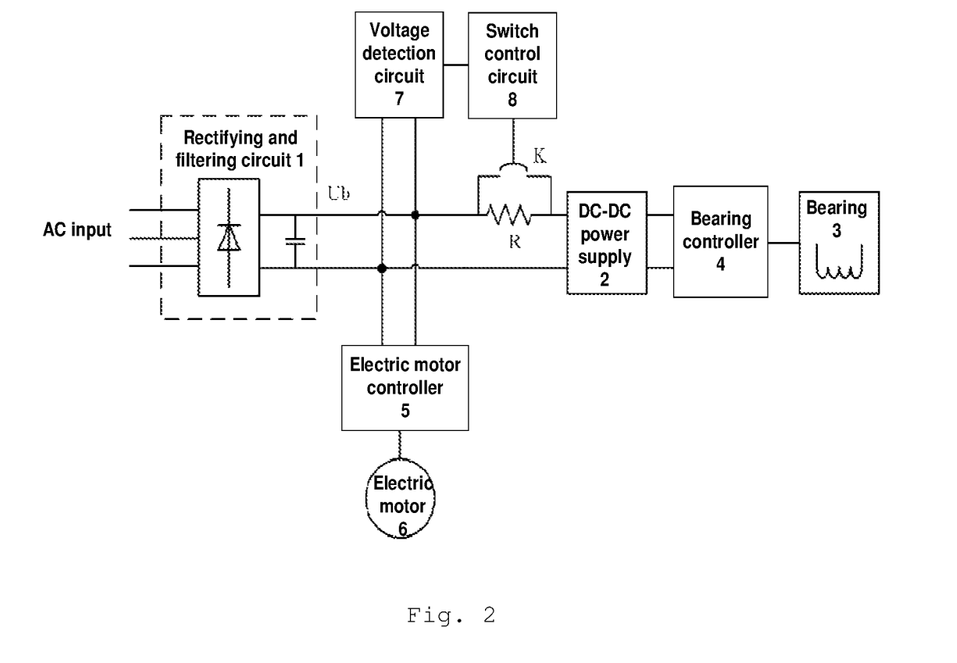
FIG. 2 is a schematic view showing the principles of a circuit of a power supply system for a magnetic bearing according to some embodiments of the present disclosure.
Figure 3:
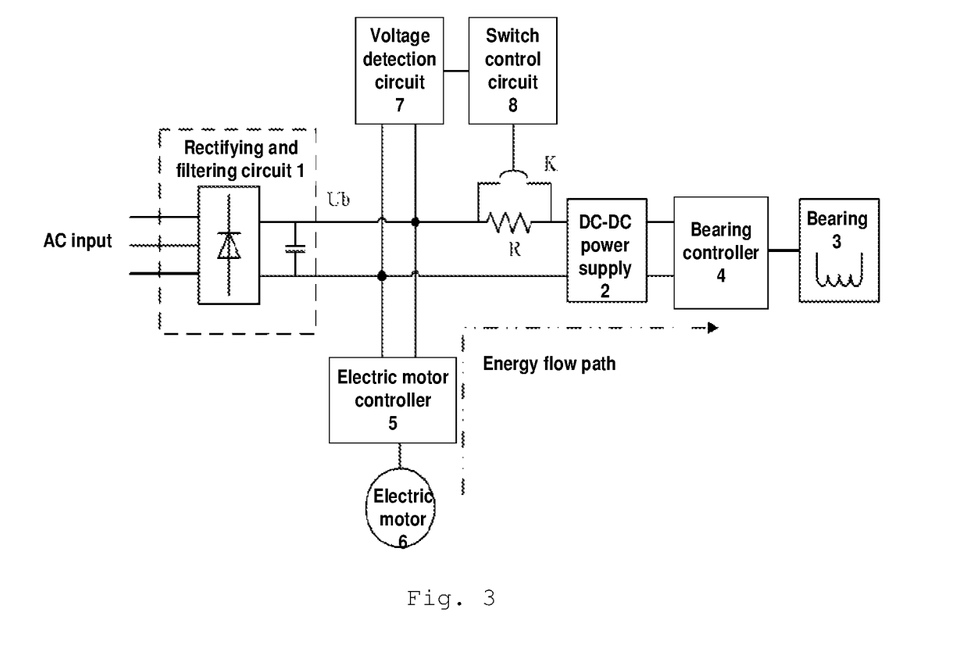
FIG. 3 is a schematic view showing an energy flow path of a power supply system for a magnetic bearing during an abnormal power off according to some embodiments of the present disclosure.

In some embodiments, the power obtaining circuit 9 comprises a control switch (e.g., a switch K) and a voltage dividing resistor (e.g., a voltage dividing resistor R), which are shown as examples in FIGS. 2 and 3.

The control switch and the voltage dividing resistor are arranged in parallel.

For example, the magnetic bearing controller is entirely powered by a DC-DC power supply which obtains power from the DC bus voltage through a parallel circuit comprising a voltage dividing resistor and a switch.

For example, the power obtaining circuit 9 comprises a switch K, a voltage dividing resistor R, and the like.

Therefore, the control switch and the voltage dividing resistor are cooperatively arranged, so that the magnetic bearing controller is entirely powered by a DC-DC power supply, thereby reducing the selection difficulty and cost of the power device in the bearing controller. The problems of a high DC bus voltage as well as a difficult selection, a high cost and a difficult control of the power device in the bearing controller are solved.

In some embodiments, the resistance value of the voltage dividing resistor is a result by dividing a difference between the upper limit of a predetermined voltage range of the first DC bus and the upper limit of the input voltage range by a predetermined input current of the DC-DC power supply 2.

Therefore, based on the difference between the upper limit of the predetermined voltage range of the first DC bus, the upper limit of the input voltage range, and the predetermined input current of the DC-DC power supply, the resistance value of the voltage dividing resistor is determined in a simple manner. The voltage is divided accurately according to the determined resistance value, which is favorable for enhancing the reliability and safety of power obtaining.

In some embodiments, the control switch comprises at least one of a solenoid valve, an electric valve, a mechanical switch, or a power switch.

In some embodiments, the voltage dividing resistor comprises a sliding resistor.

Therefore, by means of multiple forms of control switches and voltage dividing resistors, it is favorable for enhancing the flexibility and convenience of voltage obtaining and control.

In some embodiments, in the structure in which the control switch and the voltage dividing resistor are arranged in parallel, the control switch is configured to be in an on state, in a case where the AC input power supply is not off and the first DC bus voltage is within a predetermined voltage range, to exact the second direct current from the first direct current through a branch having the control switch.

For example, in a case where AC input power supply is normal, the magnetic bearing works normally, the electric motor controller 5 is in a forward driving state, and the electric motor 6 runs normally and smoothly. At this time, the first DC bus voltage is stable with a voltage value Ub within an input range allowed by the DC-DC power supply 2. The voltage detection circuit 7 synchronously detects the value of the first DC bus voltage and feedbacks the value of the first DC bus voltage to the switch control circuit 8. The switch K is in an on state, and the first DC bus voltage is directly supplied to the DC-DC power supply 2.

In some embodiments, in the structure in which the control switch and the voltage dividing resistor are arranged in parallel, the control switch is also configured to be in an off state, in a case where the AC input power supply is not off and the first DC bus voltage is higher than an upper limit of the predetermined voltage range, to obtain the second direct current from the first direct current through a branch having the voltage dividing resistor.

For example, in a case where there is a fluctuation in the amplitude of the voltage of the AC input power supply or a fluctuation in the load of the electric motor 6, a fluctuation in the first DC bus voltage is caused. In a limit case, the value of the first DC bus voltage may exceed a maximum input value allowed by the DC-DC power supply 2. In such a case, if it is not handled in time, the DC-DC power supply 2 might be damaged and the entire magnetic suspension system might be further damaged. To solve this problem, the following solutions are provided by the present disclosure.

When the voltage detection circuit 7 detects that the first DC bus voltage rises to a certain value, the switch control circuit 8 controls the switch K to be off. A voltage drop Ur is produced when the first direct current is supplied to the DC-DC power supply 2 through the voltage dividing resistor R. The input voltage Ud of the DC-DC power supply 2 is Ud=Ub−Ur, thereby reducing the value of the input voltage Ud of the DC-DC power supply.

The value of the voltage dividing resistor R can be determined according to principles as follows: based on a possible maximum value Ubmax of the first DC bus voltage and an input current Ir of the DC-DC power supply 2, a maximum input voltage Udmax=Ubmax−R*Ir of the DC-DC power supply 2 is obtained, wherein Udmax is required to be within an input voltage range allowed by the DC-DC power supply 2.

After the above processing, it is ensured that the DC-DC power supply 2 will not be damaged due to a rise in the first DC bus voltage, and the working voltage range of the DC-DC power supply 2 is widened. Meanwhile, since the DC-DC power supply 2 has the function of stabilizing a voltage, the output of the DC-DC power supply 2 is stable and will not affect the control of the magnetic bearing 3.

In some embodiments, in the structure in which the control switch and the voltage dividing resistor are arranged in parallel, the control switch is further configured to in an on state in a case where the AC input power is off, to obtain the second direct current from power generated by the electric motor 6 through the branch having the control switch.

For example, in a case where the AC input power supply is abnormally powered off, the electric motor 6 operates as a power generator, and the electric motor controller 5 is in a forward braking state to boost the voltage of the power generated by the electric motor 6 and feedback the boosted power to the DC bus to maintain the DC bus voltage to be within a reasonable range.

At this time, the switch K is on, the DC-DC power supply 2 directly obtains power from the DC bus to maintain the magnetic bearing to continue to work until the rotation speed of the electric motor drops to zero.

In a case where the electric motor controller 5 stops working, the DC bus voltage gradually drops, and the magnetic bearing controller 4 stops working, as shown in FIG. 2. The rotor can still be maintained to be suspended until the rotor stops rotation in the case of sudden power off during high-speed running of the electric motor, thereby avoiding that the entire system is damaged.

For example, in the solution of the present disclosure that the bearing controller is entirely powered by the DC-DC power supply regardless of the state of the supply power system, the voltage output by the DC-DC power supply is lower than the first DC bus voltage, a convenient selection and a low cost of the power device in the bearing controller is realized, and the control difficulty is also correspondingly reduced. The reliability of the supply power system for a magnetic bearing is improved.

For example, in the present disclosure, the bearing controller is entirely powered by the DC-DC power supply, the problem that the voltage of the power module of the bearing controller is not stable can be solved. Since the voltage output by the DC-DC power supply is lower than the first DC bus voltage, a convenient selection and a low cost of the power device in the bearing controller is realized, and the control difficulty is also correspondingly reduced. The reliability of the supply power system for a magnetic bearing is improved.

Therefore, the DC-DC power supply obtains power from the DC bus through a parallel circuit comprising a voltage dividing resistor and a switch. It is ensured that the DC-DC power supply may not be damaged due to a rise in the DC bus voltage, and the working voltage range of the DC-DC power supply is widened. The problem of damaging the DC-DC power supply and the entire magnetic bearing system due to the DC bus voltage exceeding a maximum input voltage allowed by the DC-DC power supply is solved, and the power supply system has a favorable stability and a high reliability.

Specifically, the power generated by the electric motor 6 is configured to maintain the magnetic bearing 3 to continue to run until the electric motor 6 stops running.

Specifically, the electric motor controller 5 may also be configured to boost the voltage of the power generated by the electric motor 6 and feedback the boosted power to the DC bus.

Therefore, in a case where the AC input power supply is powered off, the electric motor serves as a generator, and the magnetic bearing is maintained to continue to work by the power generated by the electric motor, thereby improving the reliability of the magnetic bearing system. Thus, the problem that the entire system is damaged due to an abnormal power off of the AC input power supply is avoided, the stability and safety of run of the magnetic bearing is enhanced, and the problem that the rotor cannot be maintained to be suspended during an abnormal power off of the AC input power supply is solved.

In some embodiments, the power supply system may further comprise a switch control circuit 8.

In some embodiments, the switch control circuit 8 is configured to control the control switch to be in an on or an off state.

For example, the switch control circuit controls the control switch to be in an on state or in an off state according to the first DC bus voltage.

Therefore, the control switch is controlled through the switch control circuit, which is favorable for enhancing the flexibility and reliability of work of the power obtaining circuit.

In some embodiments, the power supply system may further comprise a voltage detection circuit 7.

In some embodiments, the voltage detection circuit 7 is configured to detect whether the value of the first DC bus voltage is within the predetermined voltage range.

For example, the voltage detection circuit is configured to detect the value of the first DC bus voltage and feedback the value of the first DC bus voltage to the switch control circuit.

For example, a power supply system for a magnetic bearing is shown in FIG. 1. The main members of the entire system (e.g., the power supply system for a magnetic bearing) comprises: a rectifying and filtering circuit 1, a DC-DC power supply 2, a magnetic bearing 4 and a controller (e.g. a magnetic bearing controller 3), an electric motor 6 and a controller (e.g., an electric motor controller 5), a voltage detection circuit 7, a switch control circuit 8, and a power obtaining circuit 9 and the like.

For example, the voltage detection circuit 7 is configured to detect the value of the first DC bus voltage (e.g., a DC bus voltage Ub), and feedback the value of the first DC bus voltage to the switch control circuit 8 which controls the switch K to be in an on state or an off state according to the value of the first DC bus voltage.

Therefore, the DC bus voltage output by the rectifying and filtering circuit is detected by the voltage detection circuit, the stability and safety of the power supply of the magnetic bearing is enhanced.

After a large number of tests and verifications, in the technical solutions of these embodiments, the magnetic bearing controller is entirely powered by the DC-DC power supply, thereby solving the problem of damaging the DC-DC power supply and the entire magnetic bearing system due to the DC bus voltage exceeding a maximum allowed input value of the DC-DC power supply, and enhancing the reliability of the power supply.

According to embodiments of the present disclosure, a control method of the power supply system for a magnetic bearing corresponding to the power supply system for a magnetic bearing is also provided. The control method of the power supply system for a magnetic bearing comprises:

(1) An alternating current from the AC input power supply is rectified and filtered by the rectifying and filtering circuit 1 to obtain a first direct current with a first DC bus voltage. The first direct current is configured to supply power to the electric motor controller 5 of the electric motor 6 to which the magnetic bearing belongs.

For example, the rectifying and filtering circuit 1 comprises a rectifying circuit and a filtering circuit. The rectifier circuit is configured to rectify the alternating current from the AC input power supply to obtain a first direct current configured to supply power to the electric motor controller 5 of the electric motor 6 to which the magnetic bearing belongs. The filter circuit is configured to filter the first direct current and supply the filtered first direct current to at least one of the electric motor controller 5 or the power obtaining circuit 9.

For example, the alternating current from the AC input power becomes to be a direct current with a higher voltage (e.g., a DC bus voltage Ub) after being rectified and filtered by the rectifying and filtering circuit 1. The DC bus voltage Ub is supplied to the electric motor controller 5 for controlling the electric motor 6.

(2) A second direct current with a second DC bus voltage is obtained from the first direct current by the power obtaining circuit 9. The second DC bus voltage is within an input voltage range allowed by the DC-DC power supply 2.

For example, the first direct current first passes through a parallel circuit (e.g., the power obtaining circuit 9) comprising a voltage dividing resistor R and a switch K before being supplied to the DC-DC power supply 2.

(3) The second direct current is converted to a third direct current with a third DC bus voltage by the DC-DC power supply 2. The third direct current is configured to supply power to the bearing controller 4 of the magnetic bearing 3. The third DC bus voltage is within a power supply voltage range allowed by the bearing controller 4.

For example, the DC-DC power supply directly obtains power from the first direct current supplied by the power obtaining circuit 9, and the bearing controller is entirely powered by the DC-DC power supply.

For example, the DC-DC power supply 2 converts the direct current supplied by the power obtaining circuit 9 into a direct current with a stable and lower voltage before supplying to the bearing controller 4 for controlling the magnetic bearing 3.

For example, the bearing controller 4 is entirely powered by the DC-DC power supply 2.

Therefore, the magnetic bearing controller is entirely powered by the DC-DC power supply, thereby improving the stability of running of the magnetic bearing. The problem that the DC bus voltage fluctuation affects the control stability of the magnetic bearing is solved and the power supply reliability is enhanced.

In some embodiments, in a case where the power obtaining circuit 9 comprises a control switch (e.g., a switch K) and a voltage dividing resistor (e.g., a voltage dividing resistor R), the step that the second direct current is obtained from the first direct current by the power obtaining circuit 9 comprises (21) to (23).

(21) The control switch is controlled to be in an on state, in a case where the AC input power supply is not off and the first DC bus voltage is within a predetermined voltage range, to obtain the second direct current from the first direct current through a branch having the control switch.

(22) The control switch is controlled to be in an off state, in a case where the AC input power supply is not off and the first DC bus voltage is higher than an upper limit of the predetermined voltage range, to obtain the second direct current from the first direct current through a branch having the voltage dividing resistor.

(23) The control switch is controlled to be in an on state in a case where the AC input power is off to obtain the second direct current from power generated by the electric motor (6) through the branch having the control switch.

Therefore, the DC-DC power supply obtains power from the DC bus through a parallel circuit comprising a voltage dividing resistor and a switch. It is ensured that the DC-DC power supply may not be damaged due to a rise in the DC bus voltage, and the working voltage range of the DC-DC power supply is widened. The problem of damaging the DC-DC power supply and the entire magnetic bearing system due to the DC bus voltage exceeding a maximum input voltage allowed by the DC-DC power supply is solved, and the power supply system has a favorable stability and a high reliability.

In some embodiments, the step that the second direct current is obtained from the power generated by the electric motor 6 through the branch having the control switch comprises: running of the magnetic bearing 3 is maintained by the power generated by the electric motor 6 until the electric motor 6 stops running.

In some embodiments, the step that the second direct current is obtained from the power generated by the electric motor 6 through the branch having the control switch may further comprise: the power generated by the electric motor 6 is boosted to be with a higher voltage by the electric motor controller 5 and then feedbacked to the DC bus.

Therefore, in a case where the AC input power supply is powered off, the electric motor serves as a generator, and the magnetic bearing is maintained to continue to work by the power generated by the electric motor, thereby improving the reliability of the magnetic bearing system. Thus, the problem that the entire system is damaged due to an abnormally power off of the AC input power supply is avoided, the stability and safety of running of the magnetic bearing is enhanced, and the problem that the rotor cannot be maintained to be suspended during an abnormal power off of the AC input power supply is solved.

In some embodiments, the control method may further comprise: the control switch is controlled to be in an on or an off state by the switch control circuit 8 in a case where the power supply system for a magnetic bearing further comprises a switch control circuit 8.

Therefore, the control switch is controlled through the switch control circuit, which is favorable for enhancing the flexibility and reliability of work of the power obtaining circuit.

In some embodiments, the control method may further comprise: the first DC bus voltage is detected whether being within the predetermined voltage range by the voltage detection circuit 7 in a case where the power supply system for a magnetic bearing further comprises the voltage detection circuit 7.

Therefore, the DC bus voltage output by the rectifying and filtering circuit is detected by the voltage detection circuit, the stability and safety of the power supply of the magnetic bearing is enhanced.

In some embodiments, a power supply system for a magnetic bearing is shown in FIG. 1. The main members of the entire system (e.g., the power supply system for a magnetic bearing) comprises: a rectifying and filtering circuit 1, a DC-DC power supply 2, a magnetic bearing 4 and a controller (e.g., a magnetic bearing controller 3), an electric motor 6 and a controller (e.g., an electric motor controller 5), a voltage detection circuit 7, a switch control circuit 8, and a power obtaining circuit 9 and the like. The power obtaining circuit 9 comprises a switch K, a voltage dividing resistor R, and the like. The operational principles of the power supply system for a magnetic bearing are as follows.

The alternating current of the AC input power becomes to be direct current with a higher DC bus voltage (e.g., a DC bus voltage Ub) after being rectified and filtered by the rectifying and filtering circuit 1.

In some embodiments, the direct current with the DC bus voltage Ub is supplied to the electric motor controller 5 for controlling the electric motor 6.

In some embodiments, the direct current first passes through a parallel circuit (e.g., the power obtaining circuit 9) comprising a voltage dividing resistor R and a switch K before being supplied to the DC-DC power supply 2.

The DC-DC power supply 2 converts the direct current supplied by the power obtaining circuit 9 into a direct current with a stable and lower voltage before supplying to the bearing controller 4 for controlling the magnetic bearing 3.

In some embodiments, the bearing controller 4 is entirely powered by the DC-DC power supply 2.

In some embodiments, the voltage detection circuit 7 is configured to detect the value of the DC bus voltage (e.g., a DC bus voltage Ub), and feedback the value of the DC bus voltage to the switch control circuit 8 which controls the switch K to be in an on state or an off state according to the value of the DC bus voltage.

In some embodiments, the specific operational process of power supply solution for the magnetic bearing of the present disclosure is described as follows.

(1) In a case where AC input power supply is normal, the magnetic bearing works normally, the electric motor controller 5 is in a forward driving state, and the electric motor 6 runs normally and smoothly. At this time, the DC bus voltage is stable with a voltage value Ub within an input range allowed by the DC-DC power supply 2. The voltage detection circuit 7 synchronously detects the value of the DC bus voltage and feedbacks the value of the DC bus voltage to the switch control circuit 8. The switch K is in an on state, and the first DC bus voltage is directly supplied to the DC-DC power supply 2.

In a case where there is a fluctuation in the amplitude of the voltage of the AC input power supply or a fluctuation in the load of the electric motor 6, a fluctuation in the DC bus voltage is caused. In a limit case, the value of the DC bus voltage may exceed a maximum input value allowed by the DC-DC power supply 2. In such a case, if it is not handled in time, the DC-DC power supply 2 might be damaged and the entire magnetic suspension system might be further damaged. To solve this problem, the following solutions are provided by the present disclosure.

(21) When the voltage detection circuit 7 detects that the DC bus voltage rises to a certain value, the switch control circuit 8 controls the switch K to be off. A voltage drop Ur is produced when the DC bus voltage is supplied to the DC-DC power supply 2 through the voltage dividing resistor R. The input voltage Ud of the DC-DC power supply 2 is Ud=Ub−Ur, thereby reducing the value of the input voltage Ud of the DC-DC power supply.

The value of the voltage dividing resistor R can be determined according to principles as follows: based on a possible maximum value Ubmax of the DC bus voltage and an input current Ir of the DC-DC power supply 2, a maximum input voltage Udmax=Ubmax−R*Ir of the DC-DC power supply 2 is obtained, wherein Udmax is required to be within an input voltage range allowed by the DC-DC power supply 2.

After the above processing, it is ensured that the DC-DC power supply 2 will not be damaged due to a rise in the DC bus voltage, and the working voltage range of the DC-DC power supply 2 is widened. Meanwhile, since the DC-DC power supply 2 has the function of stabilizing a voltage, the output of the DC-DC power supply 2 is stable and will not affect the control of the magnetic bearing 3.

(22) In a case where the AC input power supply is abnormally powered off, the electric motor 6 operates as a power generator, and the electric motor controller 5 is in a forward braking state to boost the voltage of the power generated by the electric motor 6 and feedback the boosted power to the DC bus to maintain the DC bus voltage to be within a reasonable range.

At this time, the switch K is on, the DC-DC power supply 2 directly obtains power from the DC bus to maintain the magnetic bearing to continue to work until the rotation speed of the electric motor drops to zero.

In a case where the electric motor controller 5 stops working, the DC bus voltage gradually drops, and the magnetic bearing controller 4 stops working, as shown in FIG. 2. The rotor can still be maintained to be suspended until the rotor stops rotation in the case of sudden power off during high-speed running of the electric motor, thereby avoiding that the entire system is damaged.

Further, compared with other solutions, in the solution of the present disclosure that the bearing controller is entirely powered by the DC-DC power supply regardless of the state of the supply power system, the voltage output by the DC-DC power supply is lower than the DC bus voltage, a convenient selection and a low cost of the power device in bearing controller is realized, and the control difficulty is also correspondingly reduced. The reliability of the supply power system for a magnetic bearing is improved.

For example, in the present disclosure, the bearing controller is entirely powered by the DC-DC power supply, the problem that the voltage of the power module of the bearing controller is not stable can be solved. Since the voltage output by the DC-DC power supply is lower than the DC bus voltage, a convenient selection and a low cost of the power device in the bearing controller is realized, and the control difficulty is also correspondingly reduced. The reliability of the supply power system for a magnetic bearing is improved.

Since the treatments and functions implemented by the method embodiments basically correspond to the embodiments, principles, and examples of the system shown in FIGS. 1 to 3 described above, the description of the method embodiments is not exhaustive, and reference is made to the description of the above embodiments and thus will not be described in detail here.

After a large number of tests and verifications, in the solutions of the present disclosure, the magnetic bearing controller is entirely powered by the DC-DC power supply in a simple structure, thereby reducing the selection difficulty and cost of the power device in the bearing controller. The problems of a high DC bus voltage as well as a difficult selection, a high cost and a difficult control of the power device in the bearing controller are solved.

In summary, those skilled in the art will readily understand that the above advantageous modes is freely combined and superimposed without conflict.

The above descriptions are merely embodiments of the present disclosure and are not configured to limit the present disclosure. The present disclosure may have various changes and modifications for those skilled in the art. Any modifications, equivalent substitutions, improvements and the like, made within the spirit and scope of the present disclosure, should fall in the scope of the claims of the present disclosure.

What is claimed is:

1. A power supply system for a magnetic bearing, comprising: a rectifying and filtering circuit, a power obtaining circuit, and a DC-DC power supply, wherein:
   the rectifying and filtering circuit is configured to rectify and filter an alternating current from an AC input power supply to obtain a first direct current with a first DC bus voltage, wherein the first direct current is configured to supply power to an electric motor controller of an electric motor to which the magnetic bearing belongs;
   the power obtaining circuit is configured to obtain a second direct current with a second DC bus voltage from the first direct current, wherein the second DC bus voltage is within an input voltage range allowed by the DC-DC power supply; and
   the DC-DC power supply is configured to convert the second direct current to a third direct current with a third DC bus voltage, wherein the third direct current is configured to supply power to a bearing controller of the magnetic bearing.

2. The power supply system according to claim 1, wherein the power obtaining circuit comprises a control switch and a voltage dividing resistor which are arranged in parallel, wherein the control switch is configured to be:
   in an on state, in a case where the AC input power supply is not off and the first DC bus voltage is within a predetermined voltage range, to obtain the second direct current from the first direct current through a branch having the control switch; or
   in an off state, in a case where the AC input power supply is not off and the first DC bus voltage is higher than an upper limit of the predetermined voltage range, to obtain the second direct current from the first direct current through a branch having the voltage dividing resistor; or
   in an on state, in a case where the AC input power supply is off, to obtain the second direct current from power generated by the electric motor through the branch having the control switch.

3. The power supply system according to claim 2, wherein a resistance value of the voltage dividing resistor is a result by dividing a difference between the upper limit of the predetermined voltage range and an upper limit of the input voltage range by a predetermined input current of the DC-DC power supply.

4. The power supply system according to claim 2, wherein the power supply system has one or more of the following features:
   the control switch comprises at least one of a solenoid valve, an electric valve, a mechanical switch, or a power switch; and
   the voltage dividing resistor comprises a sliding resistor.

5. The power supply system according to claim 2, wherein the power supply system has one or more of the following features:
   the power generated by the electric motor is configured to maintain running of the magnetic bearing until the electric motor stops running; and
   the electric motor controller is further configured to boost a voltage of the power generated by the electric motor to obtain the second direct current through the branch having the control switch.

6. The power supply system according to claim 2, further comprising a switch control circuit configured to control the control switch to be in an on state or an off state.

7. The power supply system according to claim 2, further comprising a voltage detection circuit configured to detect whether the first DC bus voltage is within the predetermined voltage range.

8. The power supply system according to claim 3, wherein the power supply system has one or more of the following features:
   the control switch comprises at least one of a solenoid valve, an electric valve, a mechanical switch, or a power switch; and
   the voltage dividing resistor comprises a sliding resistor.

9. The power supply system according to claim 3, wherein the power supply system has one or more of the following features:
   the power generated by the electric motor is configured to maintain running of the magnetic bearing until the electric motor stops running; and
   the electric motor controller is further configured to boost a voltage of the power generated by the electric motor to obtain the second direct current through the branch having the control switch.

10. The power supply system according to claim 3, further comprising a voltage detection circuit configured to detect whether the first DC bus voltage is within a set voltage range.

11. The power supply system according to claim 4, wherein the power supply system has one or more of the following features:
    the power generated by the electric motor is configured to maintain running of the magnetic bearing until the electric motor stops running; and the electric motor controller is further configured to boost a voltage of the power generated by the electric motor to obtain the second direct current through the branch having the control switch.

12. The power supply system according to claim 4, further comprising a switch control circuit configured to control the control switch to be in an on state or an off state.

13. The power supply system according to claim 4, further comprising a voltage detection circuit configured to detect whether the first DC bus voltage is within a set voltage range.

14. The power supply system according to claim 5, further comprising a switch control circuit configured to control the control switch to be in an on state or an off state.

15. The power supply system according to claim 5, further comprising a voltage detection circuit configured to detect whether the first DC bus voltage is within a set voltage range.

16. The power supply system according to claim 6, further comprising a voltage detection circuit configured to detect whether the first DC bus voltage is within a set voltage range.

17. A control method of a power supply system for a magnetic bearing, comprising:
rectifying and filtering, by a rectifying and filtering circuit, an alternating current from an AC input power supply to obtain a first direct current with a first DC bus voltage, wherein the first direct current is configured to supply power to an electric motor controller of an electric motor to which the magnetic bearing belongs;
obtaining, by a power obtaining circuit, a second direct current with a second DC bus voltage from the first direct current, wherein the second DC bus voltage is within an input voltage range allowed by a DC-DC power supply;
converting, by the DC-DC power supply, the second direct current to a third direct current with a third DC bus voltage, wherein the third direct current is configured to supply power to a bearing controller of the magnetic bearing.

18. The control method according to claim 17, wherein the step of obtaining, by the power obtaining circuit, the second direct current from the first direct current comprises:
controlling a control switch in the power obtaining circuit to be in an on state, in a case where the AC input power supply is not off and the first DC bus voltage is within a predetermined voltage range, to obtain the second direct current from the first direct current through a branch having the control switch; or
controlling the control switch to be in an off state, in a case where the AC input power supply is not off and the first DC bus voltage is higher than an upper limit of the predetermined voltage range, to obtain the second direct current from the first direct current through a branch having a voltage dividing resistor in the power obtaining circuit; or
controlling the control switch to be in an on state, in a case where the AC input power is off, to obtain the second direct current from power generated by the electric motor through the branch having the control switch.

19. The control method according to claim 18, wherein the step of obtaining the second direct current from the power generated by the electric motor through the branch having the control switch comprises one or more of the following steps:
maintaining, by the power generated by the electric motor, running of the magnetic bearing until the electric motor stops running; and
boosting, by the electric motor controller, a voltage of the power generated by the electric motor to obtain the second direct current through the branch having the control switch.

20. The control method according to claim 18, further comprising one or more of the following steps:
in a case where the power supply system for a magnetic bearing further comprises a switch control circuit, controlling the control switch be in an on or an off state by the switch control circuit; and
in a case where the power supply system for a magnetic bearing further comprises a voltage detection circuit, detecting whether the first DC bus voltage is within the predetermined voltage range by the voltage detection circuit.

* * * * *